US007303052B2

United States Patent
Tsai

(10) Patent No.: US 7,303,052 B2
(45) Date of Patent: Dec. 4, 2007

(54) DEVICE FOR TIGHTENING AND LOOSENING BICYCLE BRAKE WIRE

(76) Inventor: Szu-Fang Tsai, 101, Sec. 1, Kuang-Ming Rd., Pu-Yen Hsiang, Chang-Hua Hsien (TW)

(*) Notice: Subject to any disclaimer, the term of this patent is extended or adjusted under 35 U.S.C. 154(b) by 258 days.

(21) Appl. No.: 11/115,142

(22) Filed: Apr. 27, 2005

(65) Prior Publication Data

US 2006/0243542 A1 Nov. 2, 2006

(51) Int. Cl.
*B62L 1/06* (2006.01)
(52) U.S. Cl. .............................. 188/24.19; 188/24.12; 74/502.6

(58) Field of Classification Search ............. 188/24.11, 188/24.12, 24.19, 24.22, 2 D; 74/501.5 R, 74/502.5, 502.6
See application file for complete search history.

(56) References Cited

U.S. PATENT DOCUMENTS 4,591,026 A * 5/1986 Nagano ..................... 188/2 D

* cited by examiner

*Primary Examiner*—Thomas Williams
(74) *Attorney, Agent, or Firm*—Troxell Law Office, PLLC

(57) ABSTRACT

A device for tightening and loosening a bicycle's brake wire is provided, which is installed between a handbrake operating device and a handbrake assembly of the bicycle. The device is mainly composed by a knob structure, a seat structure, and a tubular element. The knob structure and seat structure are configured such that their total length changes as the knob structure is twisted, which in turn tightens or loosens the brake wire of the bicycle. The gap between the handbrake assembly's brake pads therefore could be narrowed for the handbrake's normal operation, or loosened for dismounting the bicycle's wheel quickly and conveniently.

4 Claims, 3 Drawing Sheets

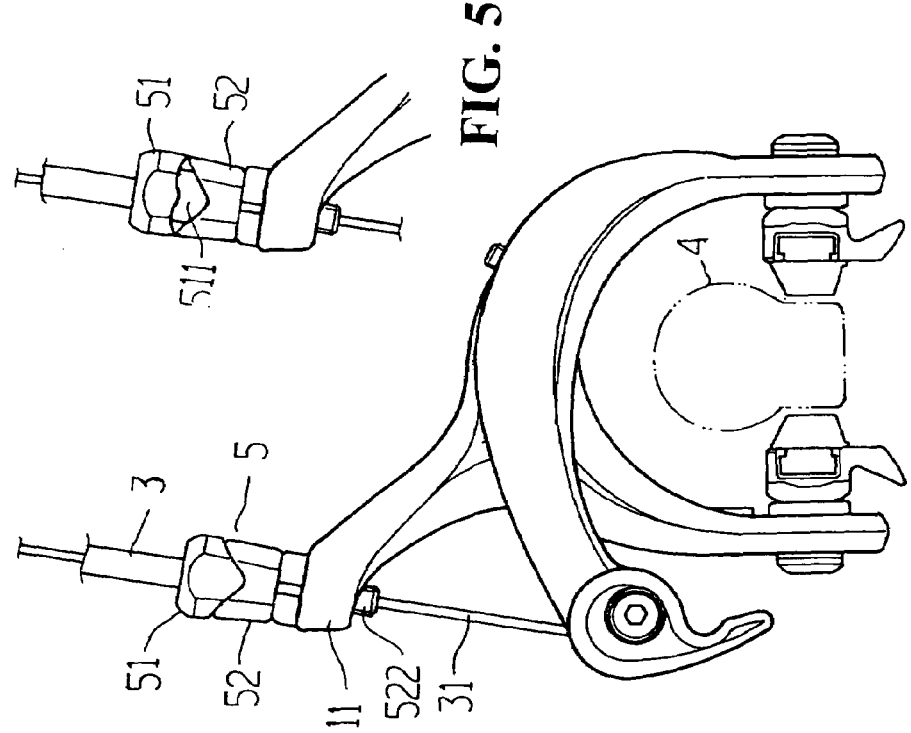
FIG. 5
FIG. 4
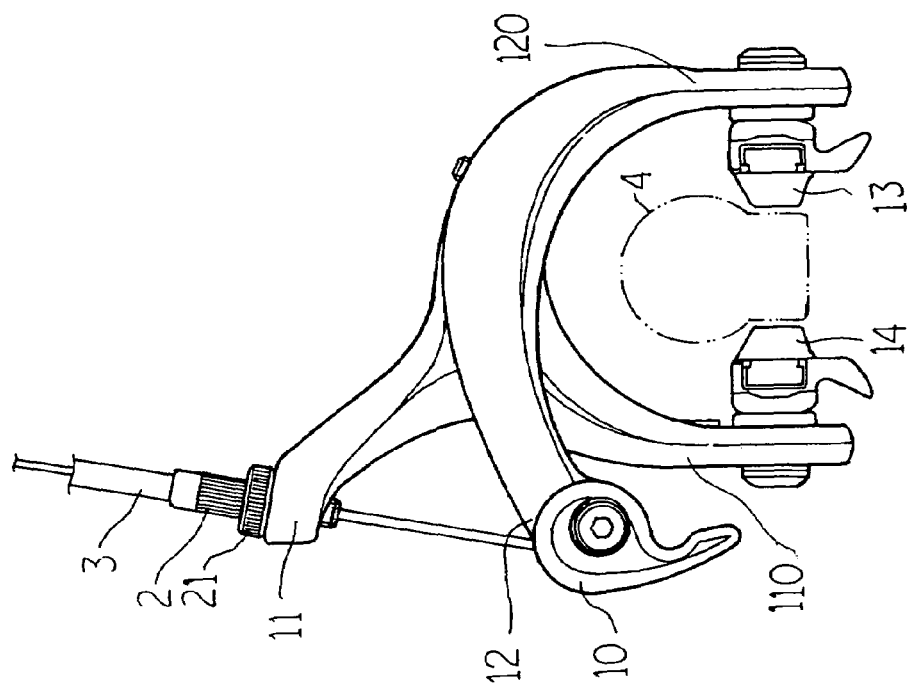
PRIOR ART
FIG. 1

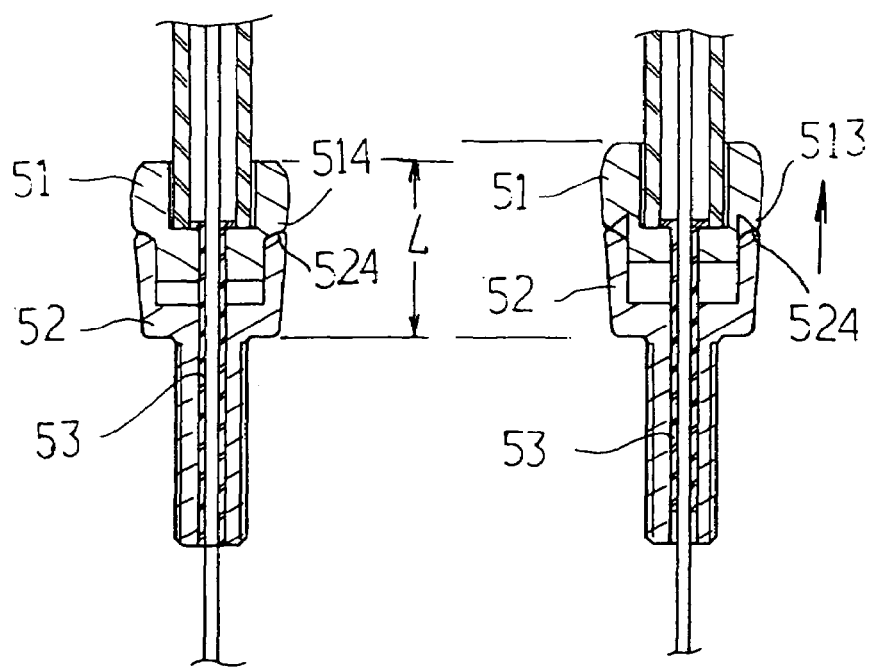
FIG. 6  FIG. 7
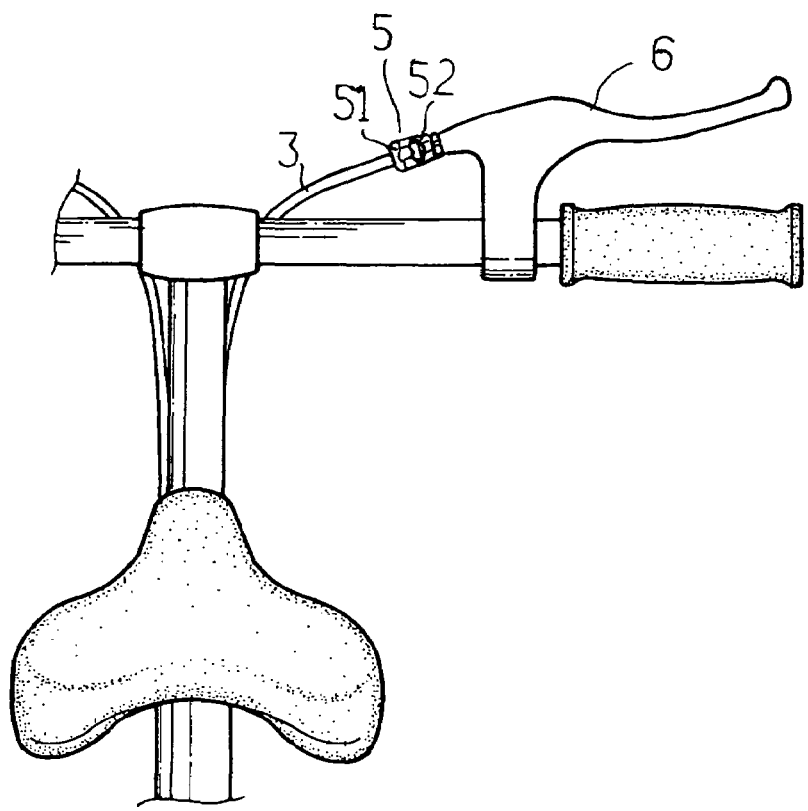
FIG. 8

DEVICE FOR TIGHTENING AND LOOSENING BICYCLE BRAKE WIRE

BACKGROUND OF THE INVENTION (a) Technical Field of the Invention

The present invention generally relates to bicycle handbrakes, and more specifically to a device positioned between the handbrake operating device and the handbrake assembly of a bicycle for fast tightening and loosening the brake wire.

(b) Description of the Prior Art

Generally, on a bicycle, there are devices for fast assembly and disassembly of some parts of the bicycle. Some typical examples include the ones at the hubs of the front and rear wheels to dismount the wheels quickly. Another one is installed under the saddle and around the seat pillar so that the height of the saddle could be adjusted quickly. There are also ones for tightening and loosening the brake wires quickly.

A bicycle handbrake system usually contains a handbrake operating device installed on the handlebar of the bicycle, a handbrake assembly installed at the two sides of the rim of the front or rear wheel, and a brake wire connected between the handbrake operating device and the handbrake assembly. When a user grips an operating lever of the handbrake operating device, the brake wire is pulled so that two brake arms of the handbrake assembly are moved toward the wheel rim, and brake pads attached to the brake arms engage the wheel rim to apply a braking force. In order to achieve greater handbrake efficiency, the brake wire is tightened and the brake pads are at close proximity to the wheel rim when the handbrake is not operated. This, however, causes a problem that the wheel is unable to pass through the gap between the brake pads when the wheel is dismounted.

As such, a conventional handbrake assembly, as illustrated in FIG. 1, has its brake wire (not numbered) inside a brake cable 3 threaded through a cabling screw 2 and a locking nut 21 at an end 11 of a brake arm 110 and connected to an eccentric device 10 at an end 12 of the other brake arm 120. To dismount the wheel 4, the device 10 is operated to loosen the brake wire and the two brake arms 110 and 120 are moved away from each other. The wheel 4 then can easily pass through the gap between the brake pads 13 and 14. However, in recent years, bicycles are usually equipped with wheels having a larger tire diameter. Therefore, an ordinary rider cannot dismount the wheels conveniently and quickly even after the device 10 is operated.

Accordingly, a new and better brake wire tightening and loosening device is provided herein to obviate the foregoing shortcomings of the conventional approaches.

SUMMARY OF THE INVENTION

The primary purpose of the present invention is to provide a device for tightening and loosening a bicycle's brake wire, which is installed between the handbrake operating device and the handbrake assembly of the bicycle. The device is mainly composed of a knob structure, a seat structure, and a tubular element. Where the knob structure and the seat structure join together, the knob structure is configured with a long tooth and a short tooth, and the seat structure is configured with a deep notch and a shallow notch, both matching the shapes and dimensions of the long and short teeth of the knob structure respectively. As such, the total length of the knob and seat structure changes as the knob structure is twisted, which in turn tightens or loosens the brake wire of the bicycle. The gap between the handbrake assembly's brake pads therefore could be narrowed for the handbrake's normal operation, or widened for dismounting the bicycle's wheel quickly and conveniently.

Another objective of the present invention is to provide a device for tightening and loosening a bicycle's brake wire, which the plastic tubular element with a ring at an end is installed in the device before threading the brake wire through the device. The tubular element on one hand reduces the function from the brake wire's directly rubbing against the device. On the other hand, the tubular element is used to string the knob structure and the seat structure together before they are actually installed on a bicycle. The brake wire's tightening and loosening devices therefore could be shipped from their product plant to the bicycle assembly line, and then installed on a bicycle much more conveniently and easily.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

FIG. 1 is a front view of a handbrake assembly having a conventional brake wire tightening and loosening device installed.

FIG. 4 is a front view showing a handbrake assembly having the brake wire tightening and loosening device of FIG. 2 installed.

FIG. 5 is a front view showing the brake wire tightening and loosening device of FIG. 2 when a brake wire is tightened.

FIG. 6 is a sectional schematic view showing the loosening of a brake wire by the brake wire tightening and loosening device of FIG. 2.

FIG. 7 is a sectional schematic view showing the tightening of a brake wire by the brake wire tightening and loosening device of FIG. 2.

FIG. 8 is a top view showing another application of the brake wire tightening and loosening device of FIG. 2.

DETAILED DESCRIPTION OF THE PREFERRED EMBODIMENTS

Figure 2:
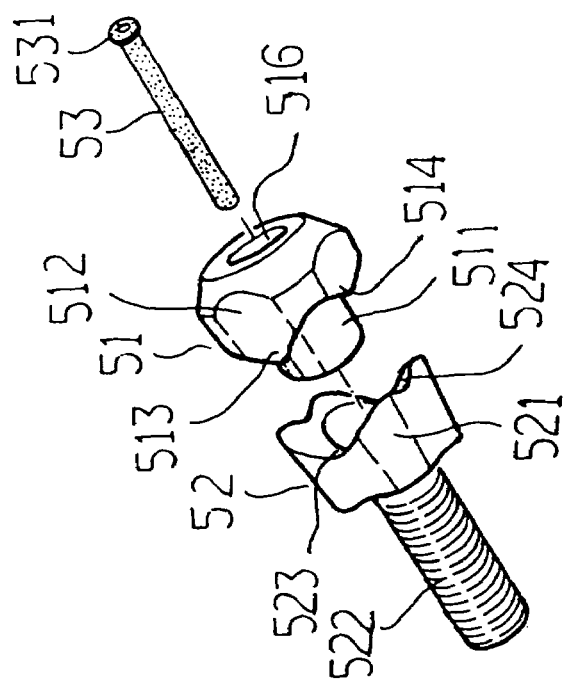
FIG. 2 is perspective explosion view showing the various components of a brake wire tightening and loosening device according to an embodiment of the present invention.

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Please refer to FIGS. 2 to 8. A brake wire tightening and loosening device 5 according to the present invention is composed of a knob structure 51, a seat structure 52, and a tubular element 53. The knob structure 51 has a tubular body 511 with a knob head 512 on the top. The bottom rim of the knob head 512 is configured with at least a long tooth 513 and at least a short tooth 514, all pointed along the knob structure 51's axial direction. On the other hand, the seat structure 52 has a knob seat 521 on top of screw body 522. The top rim of the knob seat 521 is configured with at least a deep notch 523 and a shallow notch 524 matching the shapes and dimensions of the long and short teeth 513 and 514 of the knob head 512 respectively.

Figure 3:
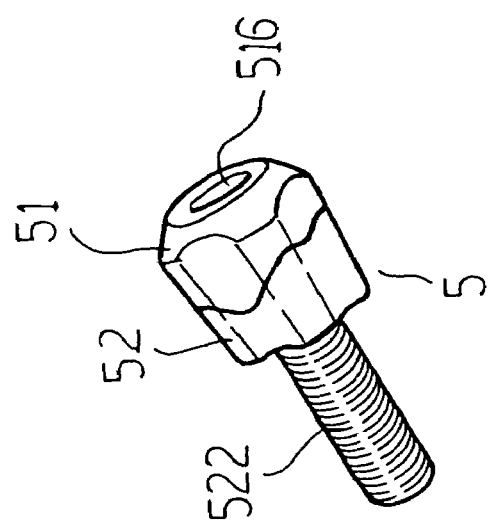
FIG. 3 is a perspective view showing the assembly of the brake wire tightening and loosening device of FIG. 2.

The knob structure 51 has a tubular through hole (not numbered) along the axis of the knob structure 51 that goes from an opening 516 at the top of the knob head 512 to the bottom of the knob structure 51. The seat structure 52 also has a tubular through hole (not numbered) along the axis of the seat structure 52. The knob seat 521 is configured such that it could accommodate the tubular body 511, and the knob structure 51 and the seat structure 52 could thereby be tightly joined together as illustrated in FIG. 3, in which the knob head 512 and the knob seat 521 has a total length L (as shown in FIG. 6).

In the present embodiment, the screw body 522 of the brake wire tightening and loosening device 5 is screwed into a cabling end 11 of a brake arm. A brake wire 31 inside a brake cable 3 is threaded through the brake wire tightening and loosening device 5 from the opening 516, via the through holes, and connected to an end of the other brake arm. When installing the handbrake system, the knob head 512 is twisted so that its long tooth 513 is inside the shallow notch 524 of the knob seat 521 to tighten the brake wire 31 (as shown in FIG. 7). The knob head 512 and the knob seat 521 now have a total length greater than L. To loosen the brake wire 31 in order to dismount a bicycle wheel, the knob head 512 is twisted so that its long tooth 513 is inside the deep notch 523 of the knob seat 521 (while its short tooth 514 is inside the shallow notch 524). As the knob head 512 and the knob seat 521 now have their total length back to L, the brake wire 31 is thereby loosened to form a larger gap between the brake pads. Then the wheel 4 could be dismounted easily.

To reduce the friction between the brake wire 31 and the metal through holes of the brake wire tightening and loosening device 5, the plastic tubular element 53 could be installed in the through holes before threading the brake wire 31. The tubular element 53 has a ring 531 at one of its ends, whose shape and dimension matches that of the opening 516. Besides reducing the friction from the brake wire 31's directly rubbing against the through holes, the tubular element 53 with its ring 531 stuck against the opening 516 is used to string the knob structure 51 and the seat member 52 together before they actually installed on a bicycle. The brake wire tightening and loosening devices 5 therefore could be shipped from their product plant to the bicycle assembly line and installed on a bicycle much more conveniently and easily.

FIG. 8 is a top view showing another application of the brake wire tightening and loosening device of FIG. 2. As illustrated, the brake wire tightening and loosening device 5 is installed at a cabling end of the handbrake operating device 6, and could deliver the identical brake wire tightening and loosening functions.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A device for tightening and loosening a brake wire of a bicycle, said device installed between a handbrake operating device and a handbrake assembly of said bicycle, said device comprising: a knob structure and a seat structure; wherein said knob structure comprises a knob head on top of a tubular body, said knob head has at least a long tooth and at least a short tooth along a bottom rim thereof, said knob structure has a tubular through hole along an axis thereof; said seat structure comprises a knob seat on top of a screw body, said knob seat has at least a deep notch and at least a shallow notch along a top rim thereof, said seat structure has a tubular through hole along an axis thereof; said tubular body of said knob structure is inserted in said tubular through hole of said seat structure so that said teeth of said knob head interface with said notches of said knob seat; said brake wire is housed in a brake cable, said brake wire has one of two ends connected to said handbrake operating device, said brake wire has the other end threaded through said device via said through holes of said knob structure and said seat structure, and connected to said handbrake assembly; said brake wire is tightened and said handbrake assembly thereby has two brake arms moved toward each other when said knob structure is twisted so that the long tooth is in said shallow notch of said seat structure and the short tooth is in said deep notch of said seat structure; and said brake wire is loosened and said handbrake assembly thereby has the two brake arms moved away from each other when said knob structure is twisted so that the long tooth is in said deep notch of said seat structure and the short tooth is in said shallow notch of said seat structure.

2. The device for tightening and loosening a brake wire of a bicycle according to claim 1, wherein said device is installed on said handbrake assembly by screwing said screw body of said seat structure to a cabling end of a brake arm of the two brake arms of said handbrake assembly.

3. The device for tightening and loosening a brake wire of a bicycle according to claim 1, wherein said device is installed on said handbrake operating device by screwing said screw body of said seat structure to a cabling end of said handbrake operating device.

4. The device for tightening and loosening a brake wire of a bicycle according to claim 1, further comprising a tubular element installed in said through holes of said knob structure and said seat structure so as to reduce the friction from said brake wire's direct rubbing against said through holes and to string said knob structure and said seat structure together before said device is installed on said bicycle.

* * * * *